Figure 1:
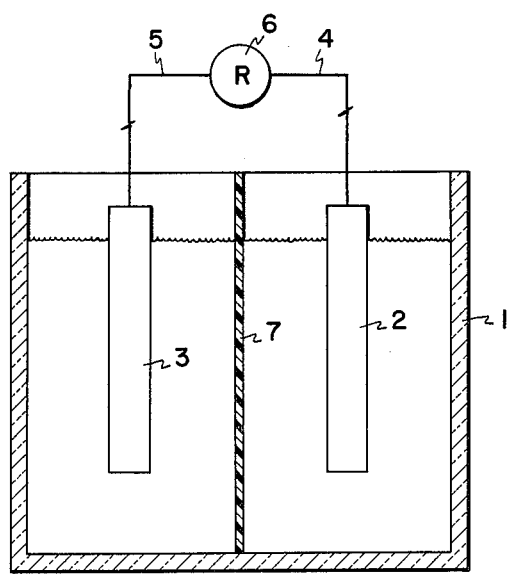

March 8, 1966  C. E. THOMPSON  3,239,382
FUEL CELL CATALYSTS

Filed Sept. 27, 1960  3 Sheets-Sheet 1

Charles E. Thompson INVENTOR
BY Alin B. Johnson

PATENT ATTORNEY

March 8, 1966 C. E. THOMPSON 3,239,382
FUEL CELL CATALYSTS
Filed Sept. 27, 1960 3 Sheets-Sheet 3

PLOT OF VOLTAGE vs. LOG OF CURRENT DENSITY

Charles E. Thompson INVENTOR
BY Alvin B. Johnson
PATENT ATTORNEY

United States Patent Office 3,239,382
Patented Mar. 8, 1966

3,239,382
FUEL CELL CATALYSTS
Charles E. Thompson, Fanwood, N.J., assignor to Esso Research and Engineering Company, a corporation of Delaware
Filed Sept. 27, 1960, Ser. No. 58,747
4 Claims. (Cl. 136—86)

This application is a continuation-in-part of application Serial No. 19,795 filed April 4, 1960, and now abandoned.

This invention relates to direct conversion of chemical energy to electrical energy by electrochemical reaction in a fuel cell employing acidic electrolytes. In particular, this invention relates to novel catalysts, the electrodes with which such catalysts are associated and to fuel cells wherein such electrodes are employed.

The term "fuel cell" has been adopted by the art to denote a primary battery wherein electrical energy is generated and an electrical potential produced directly from the chemical energy of a combustible fuel by electrochemical reaction. Fuel cells thereby avoid the thermodynamic limitations of heat engines and energy losses through friction inherent in the employment of mechanical energy. The true fuel cell differs from other primary batteries, such as the conventional storage battery, in that the fuel and oxidant are made continuously available to the cell from an outside source and the electrodes are neither consumed nor deactivated by the reaction occurring within the cell.

The fuel cell is adapted to provide power for many diverse uses, particularly those which require a direct current, e.g. cathodic protection of storage vessels, pipelines, etc. which are in contact with the soil.

The requisites of an operating fuel cell include two electrodes, i.e. an anode (fuel electrode) and a cathode (oxygen electrode), an electrolyte, a continuous supply of oxygen or other oxidizing gas or liquid, and a continuous supply, or intermittent supply with continuous availability, of combustible fuel.

Fuel cell electrodes include a conductor for the transport of electrical energy generated in the cell, which conductor either contains or is in chemical and/or physical association with a catalytic component which promotes the desired half-cell reaction necessary at this particular electrode.

Fuel cell catalysis is properly subdivided into four functional units for consideration.

In the first instance, electrolytes known to the art, whether solid, liquid or paste, are either acids or bases. The reaction mechanisms involved when an acid is employed differ radically from those occurring with caustic electrolyte. Thus, in a cell employing aqueous hydroxide electrolytes oxygen must be chemisorbed at the cathode surface in such a manner as to lead to the rapid formation of hydroxyl ions. Such ions migrate to the fuel electrode or anode where water is formed and electrons given up to the anode surface. With acid electrolytes, the hydroxyl concentration is insignificant and reaction must proceed via a different mechanism. The formation of water takes place at the cathode in acid systems.

The art is replete with evidence of the unpredictability of catalytic properties in different mediums. For example, nickel oxide, an effective cathode catalyst in a caustic cell, is essentially useless for this purpose in an acid medium.

Thus initially, electrodes, and especially the catalyst thereon, must be considered in relation to the electrolyte with which they are to be employed.

Once the character of the electrolyte is established, fuel cell catalysts must again be divided between those to be employed at the fuel electrode (anode) and those which serve to promote the half-cell reaction at the oxygen electrode (cathode). The reaction at the cathode always differs from the reaction taking place at the anode in a given cell. The half-cell reaction at the cathode is essentially independent of the particular fuel chosen to supply energy for the cell. Thus, for all practical purposes, the effectiveness of a given oxygen electrode is not conditioned upon whether hydrogen or carbonaceous fuels are reacted at the anode. Obviously, however, the fuels to be employed may be a major consideration in the selection of an anode catalyst, the activity requirements for easily chemisorbed hydrogen being much less formidable than those necessary for breaking a carbon-to-carbon bond.

This invention relates to improved catalysts for use at the oxygen electrode in systems employing acidic electrolytes.

Metals of the platinum group, i.e. platinum and palladium, are well known fuel cell catalysts. Platinum has compared favorably with the more active cathode catalysts in acid mediums. With easily chemisorbed hydrogen platinum is a moderately effective anode catalyst with caustic electrolytes. Palladium so far as it is known has never been successfully used in fuel cells employing acid electrolytes. However, in potassium hydroxide palladium has been used with considerable success at the oxygen electrode. Catalysts of this type may be employed upon any conductor base, e.g. porous carbon, steel, platinum, etc. Unless such base is completely covered with the catalyst it is essential that the base be chemically inert to the electrolyte employed.

It now has been discovered that the admixture of elemental gold in platinum group metals provides a surprisingly superior cathode catalyst when such catalyst is employed in an acid medium. The improvement obtained over platinum alone is represented both by an increase in catalytic activity and an increase in catalyst life in such medium. A platinum and gold combination has been tested and reported to be inferior to platinum alone when employed at the fuel electrode in potassium hydroxide. See "Catalysis of Fuel Cell Electrode Reactions," by G. J. Young and R. B. Roselle, Industrial and Engineering Chemistry, v. 52, No. 4, at pp. 298–300. In this article it is further reported that the use of Group VIII and 1–b metal oxides at the oxygen electrode with basic electrolyte gave only slight improvement over unactivated carbon and that alloying Group VIII metals with 1–b metals to form an alloy oxide did not materially affect the performance until a composition approaching the pure 1–b metal was reached. It is therefore surprising to find that in acid mediums a mixture of gold and platinum provides greatly increased catalytic activity at the oxygen electrode compared to either of its components and that contrary to the experience reported with basic electrolytes the highest ratios of gold to platinum in the combination are the least effective. Alloys of platinum group metals with other 1–b metals, i.e. silver and copper, do not provide this unusual effect.

For purposes of simplification, the invention will be discussed primarily with reference to the incorporation of gold in catalysts employing finely divided, active platinum which constitutes one preferred embodiment of this invention. However, a palladium and gold combination catalyst is within the scope of this invention and an operative example thereof is hereinafter set forth.

The value of active platinum catalysts, i.e. wherein platinum is employed in finely divided form, in fuel cell operations is subject to certain limitations. For example, catalysts of this type are easily poisoned or deactivated in the regular course of fuel cell operation. The incorporation of gold into a platinum group metal catalyst extends the time at which such catalysts will operate at high levels of activity and with use raises the level of catalytic activity above that obtainable with either new or used platinum catalysts.

The term "trace amounts" is herein used to designate the smallest amount of the given metal, that is detectable by simple analytical techniques, e.g. about one part per million.

The platinum and gold may be combined in all proportions extending from trace amounts of gold in platinum to trace amounts of platinum in gold. However, it is advisable to employ platinum and gold combinations wherein the gold component is the minor component of the combination.

It is to be understood, of course, that where a minor amount (less than 50 wt. percent) of platinum is employed with a major amount (more than 50 wt. percent) of gold, the combination should be viewed as increasing the activity of the relatively inactive gold catalyst and the level of activity obtainable with such combination is appreciably lower than that obtainable from combinations wherein platinum is the larger component even though the percentage increase be as great.

A desirable combination for use as the catalyst at the fuel cell cathode contains 0.001 to 20 wt. percent gold and correspondingly 80 to 99.999 wt. percent platinum.

In certain embodiments catalytic activity, economics, catalyst life, reproducibility and various other considerations dictate the most desirable combinations to be employed. Thus, it has been found that high activity can easily be reproduced with amounts in the range of 0.1 to 10 wt. percent gold. However, greater amounts of the more costly platinum metal can be replaced so as to employ from about 10 to 25 wt. percent gold while maintaining the surprisingly superior level of activity in comparison to catalysts consisting exclusively of platinum.

While I do not wish to be restricted to any particular method of admixing gold with a platinum group metal to provide the catalyst of this invention, or to any specific method for their incorporation in or association with fuel cell electrodes, suitable methods for the preparation of such catalyst sand electrodes which may be used as a guide by those skilled in the art are hereinafter set forth.

In a preferred method of preparation, a shaped porous carbon electrode base is soaked in a solution of water-soluble platinum and gold salts, such as the chlorides, nitrates, etc. of such metals, preferably the carbon to be impregnated is placed under vacuum to remove air from the pores and to facilitate entrance of the catalyst containing solution. After soaking, the carbon is dried, e.g. at a temperature of 200–300° F. and then heated to a temperature in the range of about 600° to 1000° F. under nitrogen, e.g. for about 1–5 hours, to decompose the metal containing compounds. Reduction is effected by heating the electrode under hydrogen, e.g. for about 1–5, preferably about 2–4 hours, at a temperature in the range of about 600° to 1000° F.

In a second method, the electrode base is placed in a conventional electrodeposition bath containing a solution of gold and platinum salts so as to form the negative electrode of such bath. If the electrode base is not to be completely covered by the deposited gold and platinum, the base material should be a material chemically inert to the electrolyte. A direct electric current is then passed through the bath with sufficient voltage to effect electrodeposition of gold and platinum upon the electrode base. In the alternative, gold and platinum may be depositetd separately if adequate controls are employed to effect a good mixture of the two metals on the exposed surfaces.

It is essential that the platinum and gold be admixed. It is preferred that such admixture be as complete as possible. The gold and platinum should be applied in particle size as small as possible to obtain the best results. It is preferred that this particle size does not exceed 100 A. in diameter.

Referring now to the accompanying drawings, FIGURE 1 illustrates a simple embodiment of a fuel cell wherein electrodes of this invention may be advantageously employed and wherein the electrolyte solution is shown retained in an open vessel 1. Vessel 1 may be constructed of glass, porcelain, high molecular weight polymer, or other suitable corrosion-resistant material which will not contaminate the electrolyte. Inside vessel 1 extended into the electrolytet are positioned a cathode (oxygen eleoctrode) 2 and an anode (fuel electrode) 3. The electrodes are spaced apart with each partially immersed in the electrolyte solution. Electrodes 2 and 3 are connected to an external electrical circuit represented here by wires 4 and 5 and a resistance means 6, e.g. an electric motor, light bulb, etc. The electrolyte is divided by an electrolyte separator 7, i.e. an ion permeable membrane or ion exchange resin, etc. Materials of this type are well known in the art and their use for this purpose does not comprise a part of this invention. The electrolyte surrounding the cathode and that surrounding the anode may therefore be referred to as the catholyte and the anolyte respectively. In the cell of the type shown in FIGURE 1 a liquid carbonaceous fuel, e.g. hydrocarbon or oxygenated hydrocarbon, is introduced directly into the anolyte. The oxidizing gas is supplied to the reaction surfaces of the cathode either by diffusion of oxygen from the air along the electrode surface or from a source of oxygen introduced into the electrolyte from the interior of the cathode, so as to form a three-phase contact between the cathode, the catholyte and such oxygen. Where an enclosed cell is employed, the design may include an oxygen receiving chamber from whence the oxidizing gas may diffuse through a porous cathode to the electrolyte. The cathode in such case may be in the form of a porous carbon plate. A closed cell will, of course, include means for introducing an oxidizing gas to the cathode and fuel to the anode. The fuel may be introduced to the electrolyte by diffusion through a porous anode wall or plate, or may be introduced directly into the electrolyte without passing through the anode. Where the fuel employed or the products thereof are not soluble in the electrolyte there is no requirement for an electrolyte divider. Otherwise stated, where fuel products are not permitted by physical properties or method of cell operation to come into contact with the cathode the operation of such cathode in its designed function is not interfered with.

Both gaseous and liquid fuels are suitable for use in cells employing cathodes of the type hereinbefore described.

Figure 2:
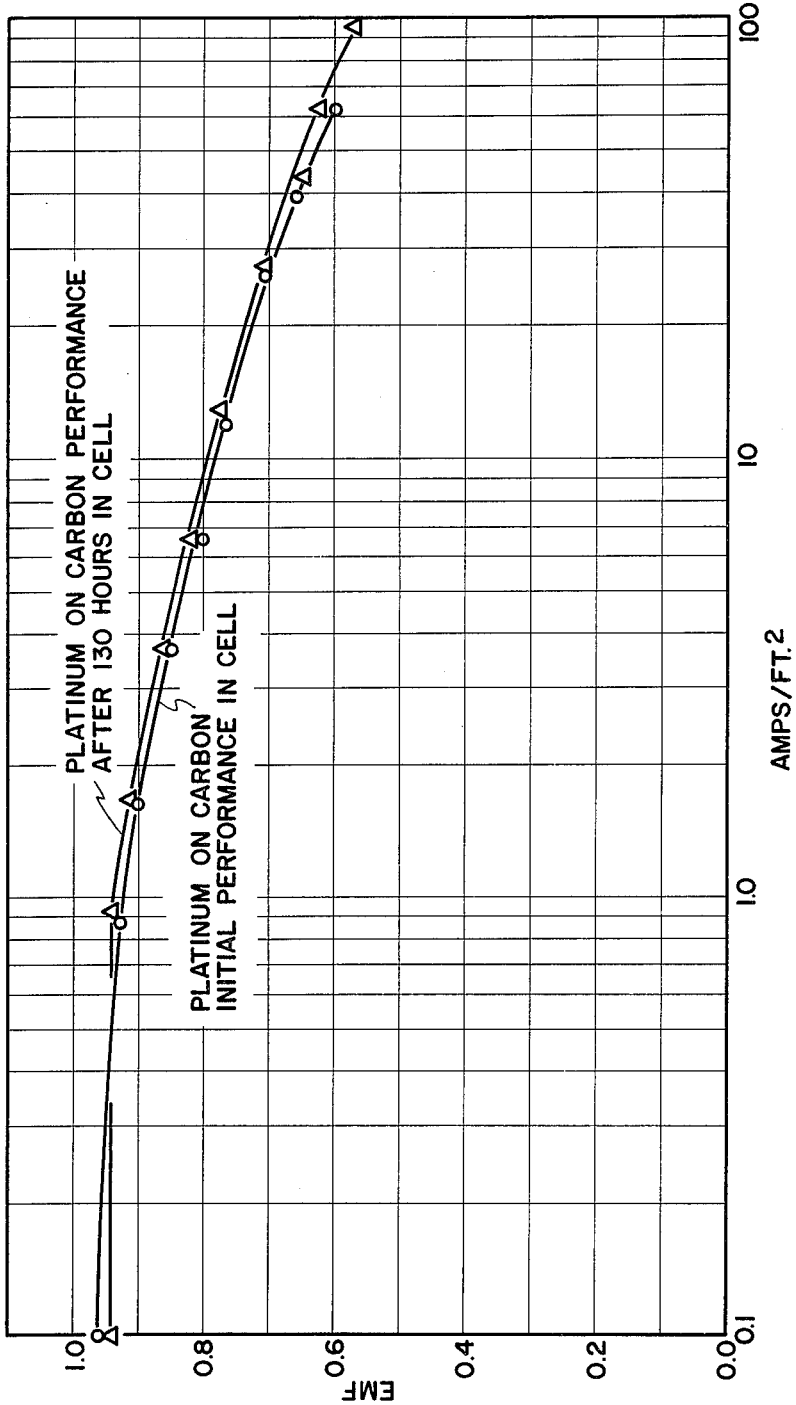
Figure 3:
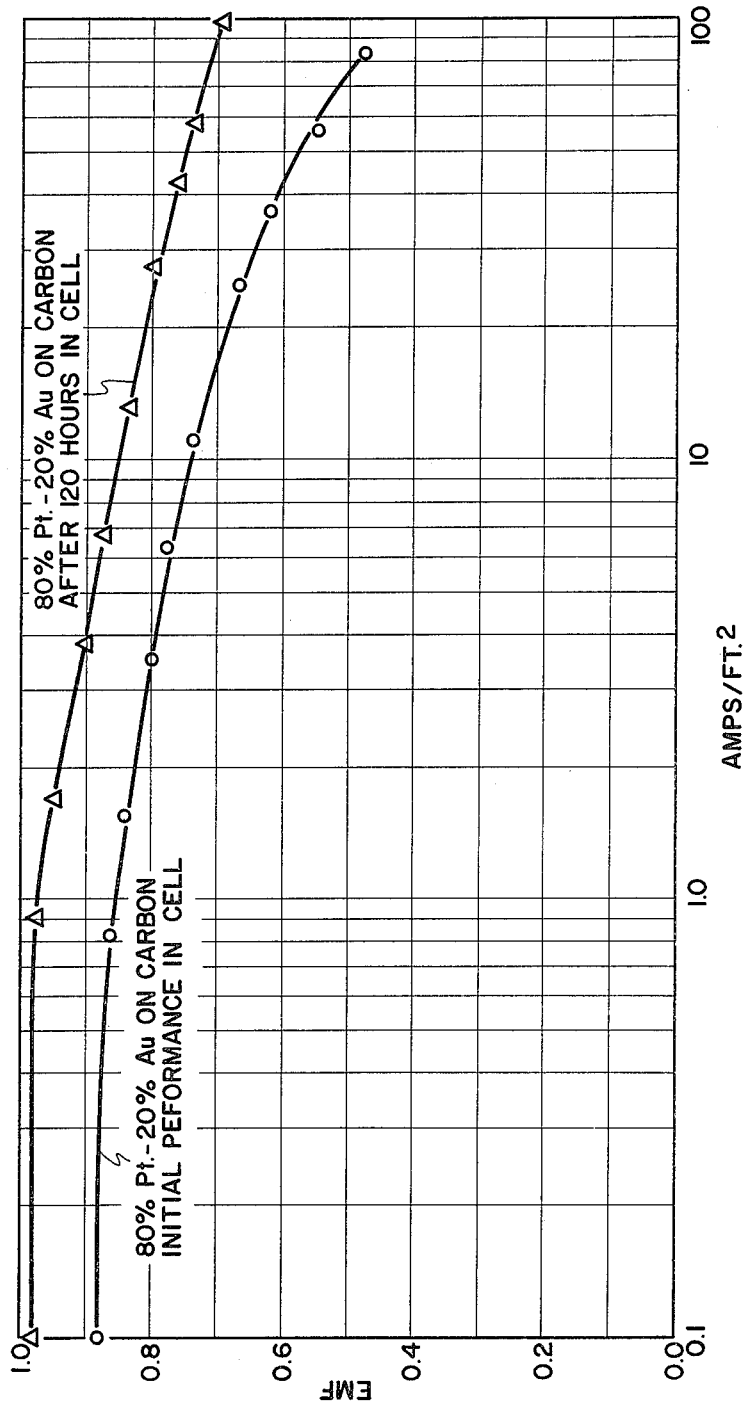

It is, of course, to be understood that the functioning of the cathode and the anode constitute essentially independent operations. Thus, for example, a suitable oxygen electrode can be used with any fuel electrode which is suitable for catalyzing the necessary reaction of the fuel employed at the surface of such anode. While the sum total of cell performance is dependent upon both the anode and cathode, the relative value of individual electrodes can be determined independently of total cell performance. FIGURES 2 and 3 of the accompanying drawings are graphic representations of performance data obtained in comparing electrodes of this invention with electrodes consisting of platinum on porous carbon.

FIGURES 2 and 3 will be described in greater detail in the operative examples hereinafter set forth.

The following illustrative examples are submitted to more fully explain the instant invention and the details thereof, and should not be construed as limitations upon the true scope of this invention as set forth in the claims.

EXAMPLE 1

Porous carbon cylinders were placed under reduced pressure, e.g. about 0.001 atmosphere, to facilitate the penetration of a treating solution throughout the porous structure. The cylinders were then soaked in an aqueous solution containing both chloroplatinic acid and auric chloride in various combinations. The soaking was carried out for about 5 to 6 hours at 180° F. using an aqueous solution wherein the total concentration of the two metal containing compounds was about 5 wt. percent. Controls were prepared in the same manner using a 5 wt. percent aqueous solution of chloroplatinic acid for a platinum control and a 5 wt. percent aqueous solution of auric chloride for a gold control. Where the compounds were mixed the weight percentage of gold in the gold-platinum solutions was about 0.003, 5.0, 20.0, 50.0, and 80.0 wt. percent. The cylinders were then dried at about 230° F. and subsequently heated to about 800° F. under nitrogen for about 2 hours to decompose the adsorbed and/or absorbed metal-containing compounds. The electrodes were then maintained at a temperature of about 800° F. in a hydrogen atmosphere for about 2 hours. The total metal deposited on carbon was in each case about 2.15 wt. percent.

The electrodes so prepared were tested in a fuel cell operation as the cathode of the cell. Hydrogen was supplied to the cell anode. The cell was operated at 180° F. at one atmosphere absolute using a 30 wt. percent $H_2SO_4$ electrolyte. Oxygen gas was employed as the oxidant. The platinum on carbon and gold on carbon electrodes hereinbefore mentioned were tested in like manner. The performance afforded by each of these electrodes was measured after allowing the cell to run until operational equilibrium had been established to avoid erratic behavior inherent in cell start-up. The results of these comparative runs are set forth in Table I.

*Table I*

INITIAL PERFORMANCE OF GOLD, PLATINUM AND PLATINUM GOLD ON CARBON ELECTRODES AT CONSTANT VOLTAGE

| Percent Gold in Catalyst (balance Pt.) | Open Circuit Potential | Amps./ft.² at 0.7 Volt [1] | Amps./ft.² at 0.6 Volt |
|---|---|---|---|
| 0.0 | 0.94 | 28 | 61 |
| 0.003 | 0.88 | 22 | 67 |
| 5.0 | 0.88 | 17 | 60 |
| 20.0 | 0.87 | 20 | 42 |
| 50.0 | 0.85 | 14 | |
| 80.0 | 0.83 | 4 | |
| 100 | 0.78 | 5 | |

[1] Based on superficial external area of cathode.

EXAMPLE 2

To further evaluate the Pt-Au catalyst in comparison to platinum catalysts, a life run was made using the platinum on carbon electrode and the 80% Pt-20% Au electrode of Table I as in Example 1. The 80–20 Pt-Au electrode was chosen since it was inferior to platinum alone in initial performance. The results of these tests under continued fuel cell use are set forth in Tables II and III. In Table II polarization at oxygen electrode is shown at a constant current draw-off after stated periods of cell operation. In Table III the current obtained at differing voltages is shown in relation to time.

*Table II*

LIFE TEST OF PLATINUM AND Pt-Au ON CARBON AT CONSTANT CURRENT

| Run, Hours | Pt on Carbon | | Pt-Au on Carbon | |
|---|---|---|---|---|
| | O.C. | $\eta$ at 50 amps./ft.² | O.C. | $\eta$ at 50 amps./ft.² |
| 3 | 0.96 | 0.39 | | |
| 18 | | | 0.88 | 0.37 |
| 27 | 0.94 | 0.39 | | |
| 39 | | | 0.94 | 0.25 |
| 52 | 0.92 | 0.50 | | |
| 67 | | | 0.93 | 0.29 |
| 78 | 1.00 | 0.42 | | |
| 96 | | | 0.98 | 0.28 |
| 106 | 0.98 | 0.37 | | |
| 120 | | | 0.99 | 0.28 |

$\eta$ = polarization-voltage loss at cathode.

This demonstrates that upon continued cell operation the polarization voltage loss at the cathode was lower and more constant with the gold-platinum combination than with platinum alone.

*Table III*

LIFE TEST OF PLATINUM AND Pt-Au ON CARBON AT CONSTANT VOLTAGES

| Catalyst on Carbon | Hours in Use | Open Circuit, E.M.F., Volts | Amps./ft.² at 0.7 Volt | Amps./ft.² at 0.6 Volt |
|---|---|---|---|---|
| Platinum | 3 | 0.96 | 28 | 60 |
| | 27 | 0.94 | 27 | 50 |
| | 78 | 1.00 | 28 | 60 |
| | 130 | 0.96 | 31 | 55 |
| Pt-Au | 18 | 0.88 | 16 | 40 |
| | 39 | 0.94 | 80 | [1] 145 |
| | 120 | 0.99 | 87 | [1] 300 |

[1] Polarization curve of oxygen electrode (voltage vs. current density) extrapolated to 0.6 volt.

The increasing superiority with use of the Pt-Au combined catalyst over platinum alone is graphically shown in FIGURES 2 and 3 of the drawings. FIGURE 2 sets forth the polarization curve for platinum on carbon in initial performance and after 130 hours of continuous cell activity with periodic current withdrawals. FIGURE 3 correspondingly demonstrates the performance of the 80% platinum-20% gold catalyst in both initial performance and after 120 hours of cell activity.

EXAMPLE 3

A carbon electrode impregnated with a palladium-gold catalyst was prepared as in Example 1 using an aqueous solution of palladium chloride and auric chloride in a Pd to Au weight ratio of 95/5. A total metal (Pd and Au) deposit of about 1 wt. percent was laid down on the carbon. The electrode so prepared was used as the oxygen electrode in a fuel cell employing an aqueous sulfuric acid electrolyte. Hydrogen was fed to the anode to establish the cell. The cell was operated at 180° F. and 1 atmosphere (absolute). This cathode vs. $H_2$ gave an open circuit potential of 0.96 volt. The polarization of this cathode at 50 amps./ft.² was 0.21 volt. This procedure was repeated except that silver was admixed with the palladium replacing the gold component. This cathode vs. $H_2$ gave an open circuit potential of only 0.88 and the polarization of such cathode at 50 amps./ft.² was 0.32 volt.

EXAMPLE 4

A platinum and gold catalyzed electrode was prepared by electrodepositing platinum and gold from an aqueous electrolyte containing chloroplatinic acid and auric chloride upon a porous carbon base. A conventional electrodeposition cell was used for this purpose with the carbon electrode base constituting the negative electrode. Direct current was passed through the cell at a voltage sufficient to deposit both gold and platinum from the electrolyte, e.g., about 1.5 to 2 volts. The electrode so prepared was employed as the oxygen electrode in a fuel cell such as those hereinbefore described. The performance obtained although not equal to the performance obtained with electrodes prepared in accordance with Example 1 was superior to that obtained from platinum on carbon electrodes prepared by the same method of electrodeposition above recited.

EXAMPLE 5

Electrodes are prepared by electrodeposition as in Example 4 except that instead of porous carbon a platinum wire base is employed. The completed electrodes are used as the cathode of an acid fuel cell and a performance improvement over duplicate electrodes minus the gold component is demonstrated.

EXAMPLE 6

The procedure of Example 1 is repeated operating a fuel cell at temperatures in the range of 175°–400° F. at elevated pressure employing a porous carbon cathode containing about 2 wt. percent of an admixture of finely divided platinum and gold containing about one part gold per million parts platinum. Different anodes are employed including porous carbon impregnated with about 10 wt. percent cobalt molybdate and porous carbon impregnated with about 10 wt. percent manganese molybdate. The electrolyte employed is aqueous sulfuric acid. Various hydrocarbons such as ethane, propane, hexane, etc., and various oxygenated hydrocarbons such as methanol, diethyl ether, acetaldehyde, formic acid and acetone are employed as fuels with each of the aforementioned anodes. Current is drawn from the cell.

The term "combustible fuels" as used herein includes the fuels heretofore disclosed in the art for fuel cell operations, e.g., hydrogen, carbon monoxide, hydrocarbons and oxygenated hydrocarbons such as alcohols, ketones, aldehydes, carboxylic acids, etc., wherein the compound involved is made up exclusively of hydrogen, oxygen and carbon.

The terms "platinum group metal" and "metal of the platinum group" herein refer only to platinum and palladium.

The term "cathode" is employed herein to refer to a fuel cell electrode at the surface of which oxygen is reduced.

The term "anode" is employed herein to refer to a fuel cell electrode at the surface of which a combustible fuel is oxidized.

All references to elements or groups of the Periodic Table herein are based upon the 1959 rev. ed. of the Periodic Chart of the Atoms designed by Henry D. Hubbard, revised by William F. Meggers and published by W. M. Welch Mfg. Co.

What is claimed is:

1. In a fuel cell comprising a cathode and an anode spaced apart and in contact with an acid electrolyte, means for passing a fluid combustible fuel into contact with said anode, means for passing an oxidizing gas into contact with said cathode, electrical conduction means connecting said anode and said cathode external to said fuel cell, said acid electrolyte providing internal electrical connection between said anode and said cathode, the improvement which comprises having as said cathode an electrically conductive structure with a catalyst thereon, said catalyst consisting of a major portion of a metal selected from the group consisting of platinum and palladium and a minor portion of gold.

2. A fuel cell as in claim 1 wherein said catalyst consists essentially of platinum and gold.

3. A fuel cell as in claim 1 wherein said catalyst consists of palladium and gold.

4. A fuel cell in accordance with claim 1 wherein said cathode consists essentially of carbon having a platinum and gold catalyst thereon.

References Cited by the Examiner

UNITED STATES PATENTS

| 409,366 | 8/1889 | Mond | 136—86 |
|---|---|---|---|
| 934,988 | 9/1909 | Adolph et al. | 204—290 |
| 2,615,932 | 10/1952 | Marko et al. | 136—122 |
| 2,860,175 | 11/1958 | Justi | 136—86 X |

FOREIGN PATENTS

| 236,578 | 7/1945 | Denmark. |
|---|---|---|

JOHN H. MACK, *Primary Examiner.*

JOSEPH REBOLD, *Examiner.*